United States Patent [19]
Gilmour et al.

[11] Patent Number: 5,128,873
[45] Date of Patent: Jul. 7, 1992

[54] AIRCRAFT RENDEZVOUS USING LOW DATA RATE TWO-WAY TACAN BEARING INFORMATION

[75] Inventors: John H. Gilmour; John S. Godleski; Randolph L. Carter; Patrick F. Didier, all of Cedar Rapids, Iowa

[73] Assignee: Rockwell International Corporation, El Segundo, Calif.

[21] Appl. No.: 463,184

[22] Filed: Jan. 9, 1990

[51] Int. Cl.⁵ .................................................. G01S 1/46
[52] U.S. Cl. ..................................... 364/451; 364/462; 342/399; 342/49
[58] Field of Search ............... 342/399, 404, 23, 46, 342/49, 29; 364/443, 451, 460, 462, 461

[56] References Cited

U.S. PATENT DOCUMENTS

| | | | |
|---|---|---|---|
| 3,153,232 | 10/1964 | Fletcher et al. | 342/29 |
| 3,195,133 | 7/1965 | Shames | 342/399 X |
| 3,336,591 | 8/1967 | Michnik et al. | 364/460 X |
| 3,699,570 | 10/1972 | Hanson et al. | 342/49 X |
| 4,143,376 | 3/1979 | Jezo | 342/49 X |
| 4,631,546 | 12/1986 | Dumas et al. | 342/399 X |

Primary Examiner—Thomas G. Black
Assistant Examiner—Thomas S. Auchterlonie
Attorney, Agent, or Firm—M. Lee Murrah; V. Lawrence Sewell; H. Frederick Hamann

[57] ABSTRACT

Aircraft rendezvous is facilitated by operating airborne remote aircraft TACAN stations in the inverse bearing mode and using low data rate range interrogation and range reply signals for determining bearing. An aircraft determines its bearing to another similarly equipped aircraft by switching its antenna to an omnidirectional pattern and transmitting range interrogation pulses and then switching its antenna to a rotating directional pattern and receiving range interrogation and range reply signals from the other aircraft. The TACAN station calculates the bearing to the other aircraft using the low data rate signals, thereby obviating the necessity of using a high power base TACAN station.

4 Claims, 3 Drawing Sheets

AIRCRAFT RENDEZVOUS USING LOW DATA RATE TWO-WAY TACAN BEARING INFORMATION

BACKGROUND OF THE INVENTION

The invention relates to new and useful improvements in aviation navigation systems and methods, and more particularly to aviation distance and bearing detection apparatus, and most particularly to tactical air navigation systems (TACAN).

In aircraft operations it is often desirable for two aircraft to rendezvous for joint operations. A good example is air-to-air refueling in which are aircraft requiring fuel rendezvous with a tanker aircraft. Various navigational methods, including TACAN have been used to direct the aircraft to a rendezvous point.

TACAN is a system used primarily by military services for transmitting and receiving range and bearing information by radio between a base station and a remote station installed in an aircraft. TACAN can operate in either a ground-to-air or an air-to-air mode. In the ground-to-air mode, the TACAN base station is located at a fixed location on the earth's surface where it is often co-located with a civilian VHF Omnirange (VOR) station to form what is called a VORTAC station. This permits civilian aircraft to use the TACAN range signal in distance measuring equipment (DME). In the air-to-air mode, to which the present invention is most applicable, the TACAN base station is placed in an aircraft.

To determine its range from a TACAN base station, an aircraft TACAN station interrogates the base station by sending a pair of interrogation radio frequency pulses of predetermined shape, duration and spacing on the TACAN frequency. The base station receives the interrogation pulses and after a predetermined delay transmits either a pair of pulses (ground-to-air mode) or a single response pulse (air-to-air mode). The remote aircraft TACAN station receives the response pulses and calculates the range from the timing difference between the transmitted and received pulses. In continuous operation the interrogation-reply process produces a low data rate of about 20-32 pulses per second. The range portion of TACAN is described in Bose, Keith H., *Aviation Electronics*, Howard H. Sams & Co. (4th Ed.-1981), p. 183, which is incorporated herein by reference.

To determine bearing from a remote aircraft station to a base station, the base station transmits a train of constant amplitude radio frequency pulses at a rate of 2700 pulses per second in the ground-to-air mode and 1300 pulses per second in the air-to-air mode. The base station combines the range reply pulses used in the range application with the bearing pulses so that a single integrated series of pulses is produced. The base station uses an antenna which has a cardioid pattern and rotates, either mechanically or electronically, the antenna pattern in an azimuthal direction at a rate of 15 Hz. From the perspective of a remote station, this produces an amplitude modulated pulsed carrier with a sinusoidally varying scan envelope with a frequency of 15 Hz. on the bearing pulse train. At the instant when the antenna pattern passes through cardinal East direction, the base station transmits a reference burst of 12 pulses having a unique, easily recognizable spacing. In the ground-to-air mode a 135 Hz. pulse overlay is also added atop the 15 Hz. envelope to provide increased bearing accuracy, but it is not critical for purposes of the present invention.

The remote aircraft TACAN station receives the bearing pulse train using an omnidirectional antenna. To a remote aircraft which is due East of the base station, the reference burst coincides with a maximum on the scan envelope. For remote aircraft at other bearings, the reference burst appears at other phase positions on the scan envelope with respect to the maximum. The bearing is thus related to the phase difference between the maximum on the scan envelope and the phase location of the reference burst. The remote aircraft TACAN station thus measures the fundamental bearing and combines this with the aircraft heading to calculate the relative bearing to the base station. Course information is added to the bearing information, and the TACAN system in the remote aircraft calculates course deviation and to-and-from information. The relative bearing, course deviation, and to-from data are normally applied to a horizontal situation indicator (HSI) in the aircraft, which displays the information for use by the flight crew.

In some air-to-air applications, it is desirable to operate TACAN in what is called the inverse bearing mode in which the omnidirectional antenna is installed on the airborne base station and the cardioid antenna with rotating pattern is installed on the remote aircraft station. In this mode the reference burst is not transmitted but is replaced by a reference pulse which is generated in the remote aircraft station by the antenna when the antenna pattern points to a convenient point on the aircraft, such as the aircraft nose. Otherwise, the inverse bearing mode operates in the same way as the normal mode, except that the bearing is determined relative to the aircraft rather than the cardinal points of the compass. This configuration can be used either in the air-to-air or ground-to-air mode, but it is most useful in the former. This configuration is particularly useful in an application such as the aircraft refueling scenario described above.

Current air-to-air rendezvous applications use the standard (not inverse) TACAN arrangement with a base station located in a tanker, for example. A major limitation drawback of this standard "flying beacon" configuration is that electrical power for operating the TACAN transmitter must be generated onboard the aircraft and is thus limited. The two pulses necessary for the range function do not require much power, but the bearing function requires a large amount of power to transmit 1300 pulses per second. Such large power levels necessitate a large heat removal capacity in the aircraft. Lower pulse rates could be used but typical current remote TACAN receivers require a minimum of about 800 pulses per second to extract usable data.

Another limitation of present air-to-air rendezvous operation using TACAN is that it is a one-way system for bearing information. Bearing transmit capability could be provided on all aircraft, but this would be very expensive, would suffer the aforementioned power limitations, and would compromise weight and space limitations. Rendezvous between aircraft not equipped with bearing transmit function is cumbersome since only one aircraft can actively seek the other. If aircraft are to actively move toward each other, radar must be used in conjunction with voice or other data communications.

Inverse TACAN has been used in air-to-air rendezvous applications but it suffers the same power limitations as the standard TACAN arrangement. However, if the power limitations could be overcome, it offers the prospect of using the approximately 15,000 active remote TACAN stations thus providing greater coverage and utility than the approximately 200 standard "flying beacon" installations.

It is therefore an object of the present invention to provide bearing information using only low data rate ranging information from a TACAN, or the like.

It is another object of the present invention to provide bilateral TACAN bearing operations.

It is a further object of the present invention to permit aircraft rendezvous more efficiently using a TACAN navigation system.

SUMMARY OF THE INVENTION

With these and other objects in view, the present invention permits an aircraft to determine its bearing to a pulse navigation system base station solely from low data rate pulses such as those normally used in TACAN systems for range determinations. The received data may be used to permit efficient rendezvous of two aircraft by means of antennas in both aircraft having selectable omnidirectional and rotating cardioid field strength patterns. A first aircraft switches its antenna to the omnidirectional pattern and transmits a low data rate pulse train to the other aircraft. The first aircraft then switches to the rotating cardioid pattern to receive pulses from the second aircraft. The first aircraft operates similarly so that each aircraft can determine its bearing to the other.

BRIEF DESCRIPTION OF THE DRAWINGS

The invention may be more fully understood by reading the following description of a preferred embodiment of the invention in conjunction with the appended drawings wherein.

DETAILED DESCRIPTION OF A PREFERRED EMBODIMENT

Figure 1:
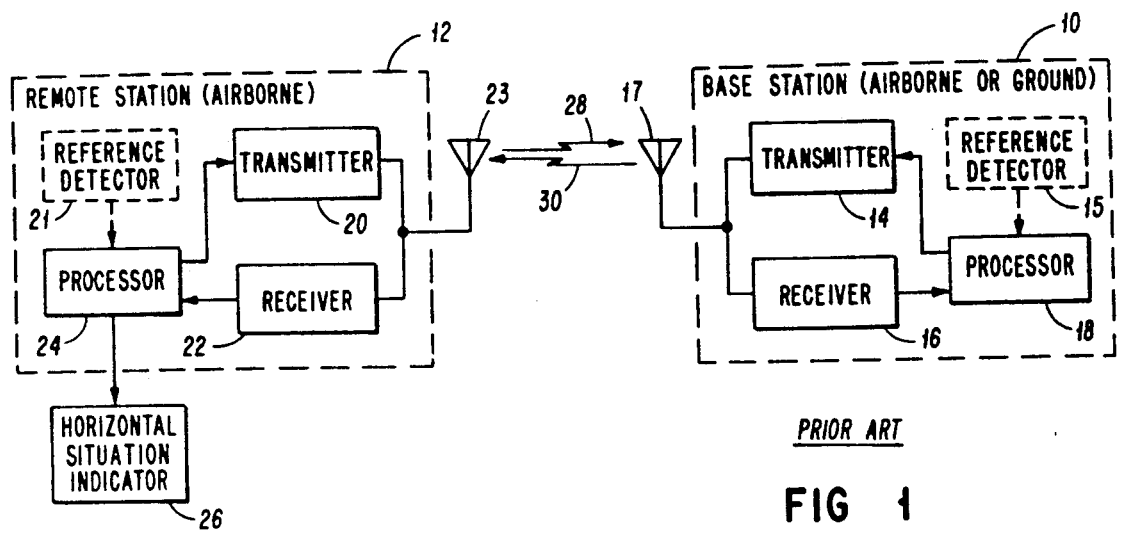
FIG. 1 is a block diagram of a TACAN base station and a TACAN remote aircraft station.

Referring first to FIG. 1, a typical TACAN system, comprising a base station 10 and a remote station 12, is shown. Base station 10, which can either be at a fixed terrestrial location or in a reference aircraft, comprises a transmitter 14 and a receiver 16 coupled to a processor 18. Processor 18 is coupled to a directional reference detector 15 when the system is used in the normal (not inverse) mode. Transmitter 14 and receiver 16 are coupled to an antenna 17. Remote station 12 is located in an aircraft which is normally airborne when the TACAN system is in use. Remote station 12 also comprises a transmitter 20 and a receiver 22 coupled to a processor 24. In the inverse mode, processor 24 is also coupled to a reference detector 21. Transmitter 20 and receiver 22 are coupled to an antenna 23, and processor 24 is also connected to a horizontal situation indicator (HSI) 26. For purposes of clarity it will be assumed in the description of FIGS. 1 and 2 that the TACAN system will be operating in the normal (not inverse) mode. The mode affects only the bearing function, and the range mode operates identically in both modes.

As previously described in general, in the range function transmitter 20 transmits a two-pulse interrogation signal via antenna 23 as indicated by arrow 28. The interrogation signal is received by receiver 16 via antenna 17 and sent to processor 18. After a predetermined delay, processor 18 causes transmitter 14 to transmit a pulsed reply signal via antenna 17 as indicated by arrow 30. The pulsed reply signal normally comprises a pulse pair in the ground-to-air mode and a single pulse in the air-to-air mode. The reply signal is received by receiver 22 and sent to processor 24, which determines the range from the time measured between the original interrogation signal and the reply signal and sends it to HSI 26 for display.

In the bearing function, processor 18 causes transmitter 14 to transmit a continuous series of pulses via antenna 17 as indicated by arrow 30. In addition, when the field pattern antenna 17 is pointed in a predetermined direction (typically East) as determined by reference detector 15, detector 15 signals processor 18 to add a reference pulse burst to the pulse train. The pulse series and reference burst are received by receiver 22 via antenna 23. Antenna 17 is provided with a cardioid pattern which typically rotates at 15 Hz., and antenna 23 is provided with an omnidirectional antenna field pattern. As used herein "cardioid" should be interpreted to include not only the specific cardioid shape but also any other shape which provides a pattern whose transmission and reception pattern is biased in a particular direction. The rotating radiation pattern of antenna 17 modulates the transmitted pulse train, and processor 24 recovers the 15 Hz. envelope and reference burst signal from the pulse train and calculates the bearing based upon the phase position of the reference burst on the 15 Hz. envelope. The result is then sent to HSI 26 for display.

Figure 2:
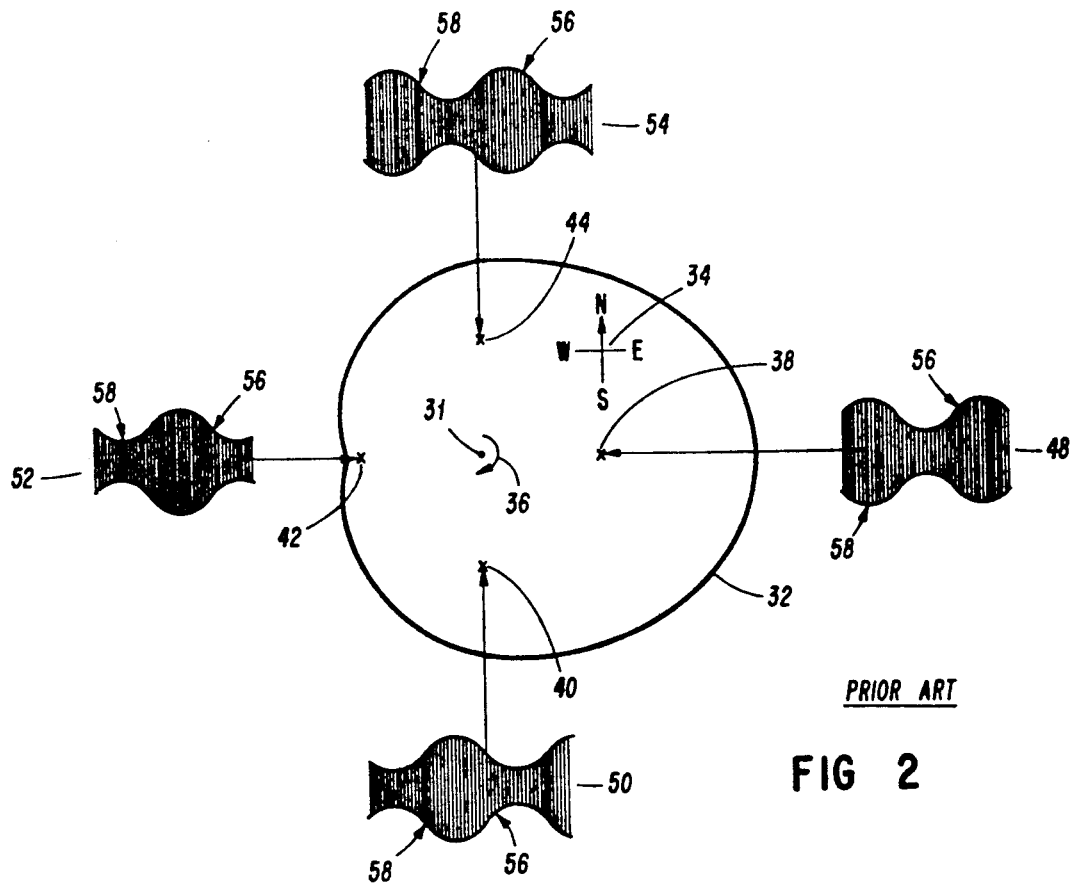
FIG. 2 is a conceptual plan view diagram showing the operation of the TACAN bearing function.

Referring to FIG. 2, the method of determining bearing in a TACAN system is schematically illustrated. A base station beacon 31 is shown surrounded by its cardioid antenna radiation pattern 32. Radiation pattern 32 rotates clockwise either mechanically or electronically as indicated by arrow 36 and sweeps across four illustrative remote aircraft TACAN stations 38, 40, 42, and 44 located exactly at the 90 (East), 180 (South), 270 (west), and 360/0 (North) degree points in azimuth. The beacon is oriented relative to the cardinal directions as illustrated by compass rose 34. Associated with each remote aircraft station is a waveform 48, 50, 52, and 54 received by each remote aircraft station, respectively. As illustrated by waveform 48, each waveform is comprised of a time series pulse train which is amplitude modulated with a sinusoidal modulation envelope 56 impressed upon the pulses train as a result of the rotation of antenna pattern 32. The pulse series includes a reference burst 58, which in waveform 48 as received by aircraft 38 coincides with the modulation envelope maximum. Since the other remote aircraft stations are located in regions of lesser antenna signal strength, reference burst 58 is located at other phase positions on envelope 56. In waveform 50 received by an aircraft 40 which is due South of beacon 31, reference burst 58 leads the envelope maximum by 90 degrees. Similarly, reference burst 58 received by aircraft 42 due West of beacon 31 leads the envelope maximum by 180 degrees. Finally, aircraft 44 receives reference burst 58 such that it is displaced from the envelope maximum by 270 degrees. Other aircraft located at other azimuthal positions between the cardinal directions would receive waveforms with the reference burst displaced proportionately. Aircraft 38, 40, 42, and 44 use the same waveforms as shown whether the TACAN is operating in the normal mode or the inverse mode. The only difference is that in the inverse mode the modulation occurs at the remote receiving aircraft rather than at the transmitting base station and the reference burst 58 is replaced by a reference pulse generated in the remote aircraft station by the reference detector 21.

Referring to FIG. 1, the operation of the TACAN system of FIG. 1 in the inverse mode will now be described. As previously stated, the range function operates identically in both modes and will therefore not be described again. In the bearing function, processor 18 causes transmitter 14 to transmit a continuous series of pulses via antenna 17 as indicated by arrow 30. In this mode reference detector 15 is not present in base station 10. The pulse series is received by receiver 22 via antenna 23. Antenna 17 is provided with an omnidirectional radiation pattern while antenna 23 is provided with a rotating cardioid radiation pattern which typically rotates at 15 Hz. The rotating antenna pattern amplitude modulates the received pulse train. A directional reference is provided by reference detector 21 which sends a pulse to processor 24 when antenna 23 points to a predetermined reference point on the aircraft, which is usually defined to be the nose of the aircraft. Processor 24 recovers the 15 Hz. envelope and, using the reference pulse from reference detector 21, calculates the relative bearing based upon the phase relationship between the occurrence of the reference pulse and the 15 Hz. envelope. The result is again sent to HSI 26 for display.

Figure 3:
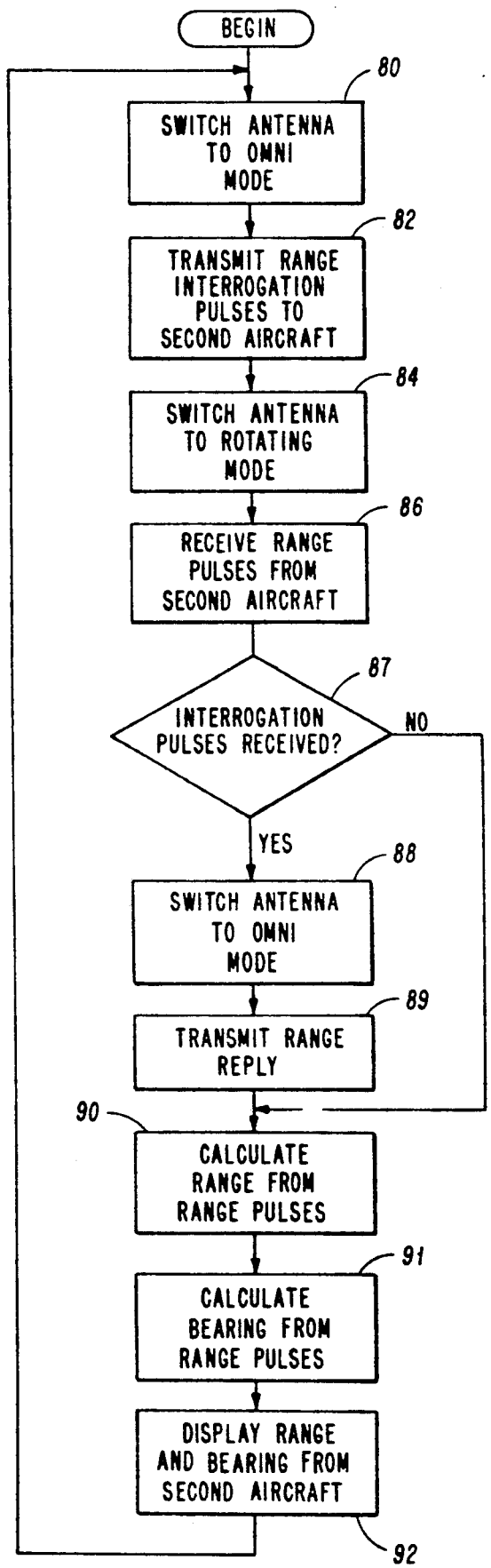
FIG. 3 is a flow chart illustrating the method of bilateral TACAN bearing operations using low data rate ranging signals.

The present invention provides two-way, or bilateral, TACAN bearing capability using only the low data rate ranging information. FIG. 3 describes the method used to accomplish this result. Each aircraft is equipped with a TACAN system which implements the inverse bearing mode. This capability requires that the receiving antenna (antenna 23 in FIG. 1) be switchable between a rotating cardioid reception pattern and an omnidirectional transmitting pattern.

In the method of the present invention, two aircraft which desire to rendezvous are identically equipped as just described, and they interact in the manner to be described from the standpoint of one of the aircraft. Initially, the antenna of the first aircraft is switched to the omnidirectional mode block 80). While in the omnidirectional mode, the first aircraft's TACAN transmits range interrogation pulses as shown in block 82. Next, the first aircraft's antenna is switched to the rotating mode (block 4), and range interrogation and reply pulses are modulated and received (block 86) from the second aircraft. The range pulses are tested in block 87, and if they are interrogation pulses the antenna is switched to the omni mode in block 88 and a range reply is transmitted in block 89. Otherwise blocks 88 and 89 are bypassed. The modulated range pulses received in block 86 are used to calculate the range (block 90) and bearing of the second aircraft relative to the nose of the first aircraft (block 91), and the result may be displayed on an HSI or other display (block 92). The same process is endlessly repeated as long as the TACAN is in operation. At the same time the second aircraft performs the same method such that each aircraft acts as the base TACAN station for the other as they close toward rendezvous. Both aircraft TACAN stations transmit preferably at a rate of 32 Hz. with a small plus/minus random frequency jitter to assure that the two aircraft stations do not transmit and receive in a synchronized manner. This method when combined with radar-type displays permits the low data rate bilateral TACAN to be used as a low cost, low emission alternative to radar navigation.

Figure 4:
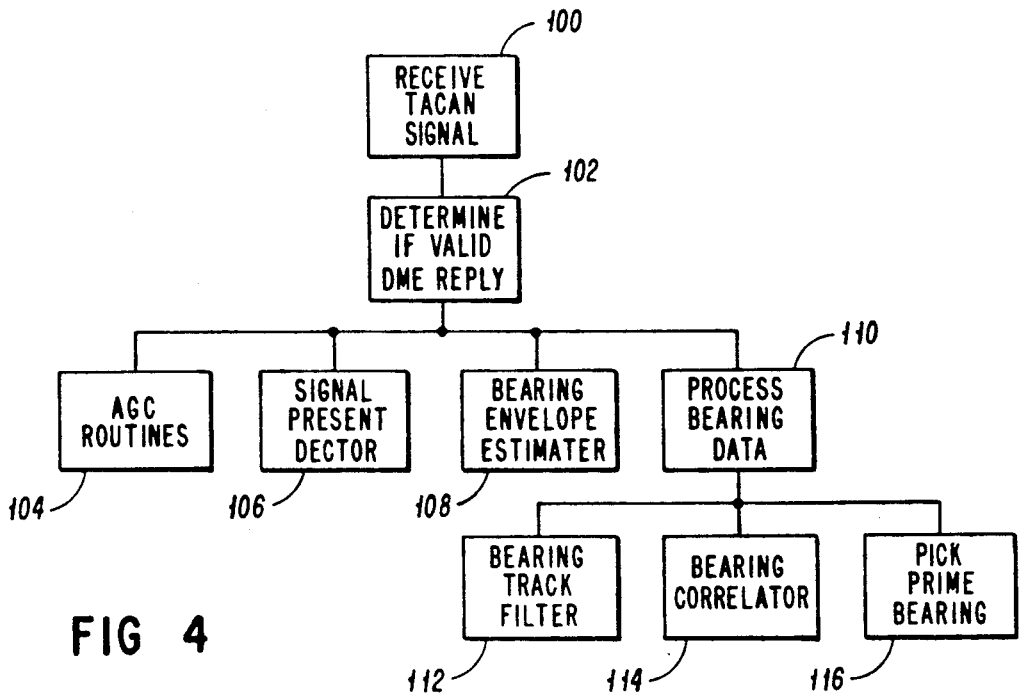
FIG. 4 is a block diagram of processing modules used in the present invention to determine AGC and bearing.

Referring to FIG. 4, the manner of processing the received low data rate TACAN information is generally described. Except as noted, the details of this method are well-known in the art and are thus described only in outline form here. The process begins with reception of a TACAN signal (block 100) followed by determination if the DME reply is valid (block 102). If the DME reply is valid, AGC routines 104 slowly increase their gain until a valid air-to-air decode is obtained as will be discussed in connection with FIG. 5. In addition, time and amplitude of the recovered pulse are sent to modules 104, 106, 108, and 110. Next signal present detector 106 determines if the bearing signal is present by testing the bearing amplitude modulation and main burst (receiver reference pulse). If the minimum amount of modulation and main burst are not received, then the bearing search initialization routine is called. If the requisite signal is present, bearing envelope estimator 108 receives pulses and estimates the DC component of the received signal and the main and phase estimates of the main sinusoid. Next the bearing data is processed in block 110 which is further broken down functionally into blocks 112, 114, and 116 whose descriptions follow. Bearing track filter 112 provides filtered estimates of the bearing and bearing rate. The output from bearing track filter 112 is received by bearing correlator 114 and stores the filtered estimate in a hit array which is continually updated. A record is kept of the number of times an estimate correlates. Finally, a routine in block 116 reviews the hit array and determines which entry, if any, correlates sufficiently to be a prime candidate for bearing lock-on.

Figure 5:
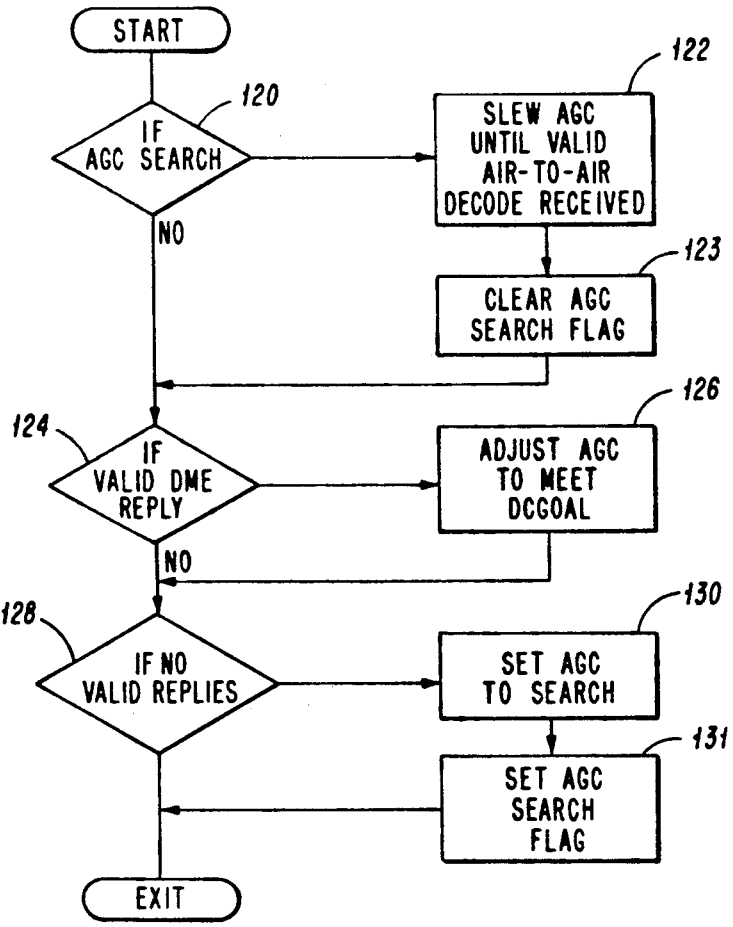
FIG. 5 is a functional flow chart of the AGC routines used in the present invention.

Referring to FIG. 5, the operation of the automatic gain control (AGC) routines shown in block 104 of FIG. 4 is shown. In decision block 120, if an AGC search is selected, the gain of the AGC circuit is gradually increased, or slewed, in block 122 until a valid air-to-air interrogation decode is achieved. Also, an AGC search flag is set to false in block 123. Once the decode is achieved, or if the decision in block 120 is negative, the validity of the DME reply is determined in decision block 124. If a valid DME reply is achieved, the AGC is adjusted in block 126, based upon the amplitude of the received DME reply to meet the optimum DC component needed by the receiver. Once the AGC is adjusted, or if the result in block 124 is negative, then decision block 128 determines whether there have been no valid replies. If not, the AGC search mode is initiated in block 130, and the AGC search flag is set to TRUE in block 131. Otherwise, the routine is exited and eventually re-entered at block 120.

The invention has been described for use with aircraft employing the TACAN navigation system. It should be understood, however, that the invention can be used in any type of vehicle having an unknown position and can be performed using any type of reply pulse navigation system.

While particular embodiments of the present invention have been shown and described, it should be clear that changes and modifications may be made to such embodiments without departing from the true scope and spirit of the invention. It is intended that the appended claims cover all such changes and modifications.

We claim:

1. A method of converging two aircraft equipped with a TACAN transmitter, receiver and an antenna, comprising the steps of:

switching the antenna in a first aircraft to an omnidirectional mode;

transmitting a train of TACAN range interrogation pulses from the first aircraft;

switching said antenna in the first aircraft to a directional mode;

receiving a train of TACAN range reply pulses from a second aircraft;

separating said range reply pulses from the second aircraft from range reply pulses from other aircraft;

processing only said range reply pulses to derive directional information related to said second aircraft; and piloting said first aircraft toward said second aircraft using the directional information.

2. The method of claim 1 wherein said processing step comprises:

rotating the reception pattern of said antenna to amplitude modulate said received second train of pulses;

generating a periodic reference signal when said antenna points to a predetermined point on said first aircraft; and determining the direction to said second aircraft relative to the predetermined point on said first aircraft from the phase relationship between the modulated second pulse train and said periodic reference signal.

3. The method of claim 2 wherein the same steps are performed in said second aircraft.

4. A method for determining the heading from a first aircraft to a second aircraft, each of which is equipped with a TACAN transmitter, a TACAN receiver, and an antenna, the antenna on the first aircraft being a bimode antenna switchable between a rotating directional mode and an omnidirectional mode, comprising the steps of:

switching the bimode antenna in said first aircraft to the onmidirectional mode;

transmitting a train of TACAN range interrogation pulses from said first aircraft via the bimode antenna;

switching said bimode antenna in said first aircraft to the rotating directional mode;

receiving in said first aircraft a train of TACAN range reply pulses from the second aircraft, said rotating antenna amplitude modulating said received train of pulses;

identifying only the range reply pulse train transmitted by said second aircraft; and calculating the heading to said second aircraft from said modulated train of reply pulses.

* * * * *